(12) United States Patent
Erb

(10) Patent No.: US 10,498,734 B2
(45) Date of Patent: Dec. 3, 2019

(54) POLICY SERVICE AUTHORIZATION AND AUTHENTICATION

(71) Applicant: Netsweeper (Barbados) Inc., St. Michael (BB)

(72) Inventor: Jeremy Erb, Guelph (CA)

(73) Assignee: Netsweeper (Barbados) Inc., St. Michael (BB)

( * ) Notice: Subject to any disclaimer, the term of this patent is extended or adjusted under 35 U.S.C. 154(b) by 0 days.

(21) Appl. No.: 14/401,543

(22) PCT Filed: May 31, 2013

(86) PCT No.: PCT/CA2013/000535
§ 371 (c)(1),
(2) Date: Nov. 17, 2014

(87) PCT Pub. No.: WO2013/177687
PCT Pub. Date: Dec. 5, 2013

(65) Prior Publication Data
US 2015/0143453 A1 May 21, 2015

Related U.S. Application Data

(60) Provisional application No. 61/655,179, filed on Jun. 4, 2012, provisional application No. 61/653,700, filed on May 31, 2012.

(51) Int. Cl.
*H04L 29/06* (2006.01)
*H04L 12/24* (2006.01)
*H04L 29/08* (2006.01)

(52) U.S. Cl.
CPC .......... *H04L 63/10* (2013.01); *H04L 41/0893* (2013.01); *H04L 63/0245* (2013.01);
(Continued)

(58) Field of Classification Search
CPC ........................................................ H04L 63/10
(Continued)

(56) References Cited

U.S. PATENT DOCUMENTS

| 5,987,611 A | 11/1999 | Freund |
| 6,442,577 B1 | 8/2002 | Britton et al. |

(Continued)

FOREIGN PATENT DOCUMENTS

| WO | WO9966384 | 12/1999 |
| WO | 03/001324 A2 | 1/2003 |

(Continued)

OTHER PUBLICATIONS

International Search Report, International Application No. PCT/CA2012/000994, International Filing Date—Oct. 26, 2012, 3 pages.

(Continued)

*Primary Examiner* — Peter C Shaw
(74) *Attorney, Agent, or Firm* — Reising Ethington P.C.

(57) ABSTRACT

Requests for remote network resources can be denied by a policy service by redirecting a requesting user agent to an authorization portal. The authorization portal can authenticate the user agent and redirect the user agent to the originally requested resource with a token. The policy service can be configured to detect the token, and redirect the requesting user agent to the resource with a cookie. The policy service can be configured to reference such cookies when applying policy. Accordingly, an authenticated user agent can be allowed to access the remote network resource and resources at the same host/domain by virtue of the cookie and without additional authentication.

23 Claims, 8 Drawing Sheets

(52) U.S. Cl.
 CPC .......... *H04L 63/102* (2013.01); *H04L 63/168* (2013.01); *H04L 67/02* (2013.01)

(58) Field of Classification Search
 USPC .......................................................... 726/1
 See application file for complete search history.

(56) References Cited

U.S. PATENT DOCUMENTS

| | | | |
|---|---|---|---|
| 7,954,144 | B1 | 5/2011 | Ebrahimi et al. |
| 7,958,258 | B2 | 6/2011 | Yeung et al. |
| 2003/0182420 | A1 | 9/2003 | Jones et al. |
| 2004/0107360 | A1* | 6/2004 | Herrmann ............... H04L 63/08 726/1 |
| 2004/0167984 | A1 | 8/2004 | Herrmann |
| 2005/0138421 | A1* | 6/2005 | Fedronic ................. G06F 21/32 726/4 |
| 2005/0144297 | A1 | 6/2005 | Dahlstrom et al. |
| 2006/0021004 | A1* | 1/2006 | Moran .................... H04L 63/08 726/2 |
| 2006/0265586 | A1* | 11/2006 | Transy ..................... G06F 21/34 713/155 |
| 2007/0255841 | A1* | 11/2007 | Chong ................ H04L 63/0807 709/229 |
| 2008/0141339 | A1* | 6/2008 | Gomez ................... H04L 63/08 726/1 |
| 2008/0282338 | A1 | 11/2008 | Beer |
| 2011/0060838 | A1 | 3/2011 | Yeung et al. |
| 2011/0173682 | A1* | 7/2011 | Perry .................... H04W 12/06 726/4 |
| 2011/0231918 | A1* | 9/2011 | Shah ....................... G06F 21/41 726/8 |
| 2011/0239283 | A1* | 9/2011 | Chern ..................... G06F 21/33 726/6 |
| 2013/0024919 | A1* | 1/2013 | Wetter .................. G06F 21/335 726/6 |
| 2013/0086656 | A1* | 4/2013 | Paddon ................. G01S 19/246 726/6 |
| 2013/0269020 | A1* | 10/2013 | Griffin ................ H04L 63/0884 726/9 |
| 2014/0115724 | A1* | 4/2014 | van Brandenburg ... G06F 21/10 726/30 |

FOREIGN PATENT DOCUMENTS

| | | |
|---|---|---|
| WO | 2009/117733 A2 | 9/2009 |
| WO | WO2011004258 A2 | 1/2011 |
| WO | WO 2013/177660 A1 | 12/2013 |
| WO | WO 2013/177687 A1 | 12/2013 |

OTHER PUBLICATIONS

International Search Report, International Application No. PCT/CA2013/000535, International Filing Date—May 31, 2013, 3 pages.
European Search Report—Application No. 13797896.1-1870/2856702, PCT/CA2013000535, Applicant: Netsweeper (Barbados) Inc., dated Dec. 16, 2015, 7 pages.
Extended European Search Report dated Feb. 4, 2016 for European Patent Application No. 12882523.9.
SA Law LLP, UK High Court of Justice, Intellectual Property Enterprise Court, Claim Form N1, Claim No. IP-2017-000169, between: Prosyscor Limited and Netsweeper Inc. et al., Sep. 1, 2017.
SA Law LLP, UK High Court of Justice, Intellectual Property Enterprise Court, Particulars of Claim Form, Claim No. IP-2017-000169, between: Prosyscor Limited and Netsweeper Inc. et al., Jan. 26, 2018.

* cited by examiner

FIG. 7

| URL 200 | CATEGORY 202 |
|---|---|
| http://www.example.com/badpage.htm | malicious |
| http://www.zombo.com | business |
| ... | ... |
| *.goodsite.com/* | crafts |
| http://www.authportal.com/* | auth |

FIG. 8

| USERNAME 204 | GROUP 206 |
|---|---|
| judymeyers | students |
| logbert | teachers |
| ... | ... |
| superuser | admin |

FIG. 9

| GROUP 206 | CATEGORY 202 | POLICY 208 |
|---|---|---|
| teachers | malicious | deny |
| teachers | auth | allow |
| ... | ... | ... |
| students | crafts | allow |

FIG. 10

| GROUP 206 | DENY PAGE 210 |
|---|---|
| unknown | http://www.authportal.com/login |
| teachers | http://www.aportal2.com/login |
| ... | ... |
| staff | www.authportal.com/deny |

POLICY SERVICE AUTHORIZATION AND AUTHENTICATION

CROSS-REFERENCE TO RELATED APPLICATIONS

This application claims priority to U.S. provisional application No. 61/653,700, filed May 31, 2012, and U.S. provisional application No. 61/655,179, filed Jun. 4, 2012, both of which are incorporated herein by reference.

FIELD

This disclosure relates to computers and, more specifically, to computer network policy.

BACKGROUND

Network policy can be used to prevent undesirable material from being retrieved by a computer. Such material can include malicious code that detrimentally modifies the behaviour of the retrieving computer, adult-oriented material that is unsuitable for viewing by a child that has access to the computer, and similar material.

In the past, proxies have been used to enforce policy by responding to requests with policy decisions, filtering content, and similar. However, placing a proxy between the requesting computers and the requested content can create a bottleneck, in that allowed requests may not be fulfilled quickly enough to meet demand. Further, administering proxies can be onerous, particularly in large organizations.

SUMMARY

According to one aspect of the present disclosure, a method of applying network resource access policy includes receiving from a user agent a request for a remote network resource, obtaining from the request authorization data specific to the remote network resource when the request contains the authorization data, and determining a resource access policy for the request, including using the authorization data, if obtained, to determine the resource access policy for the request. The method further includes applying the resource access policy to allow or deny access by the user agent to the remote network resource, and when denying access to the remote network resource, redirecting the user agent to an authorization portal. The method further includes, after authorization by the authorization portal, receiving from the user agent an authorized request for the remote network resource, the authorized request including an authorization token. The method further includes, in response to receiving the authorized request including the authorization token, storing the authorization data specific to the remote network resource at the user agent and redirecting the user agent to the remote network resource to cause the user agent to make another request for the remote network resource.

Storing the authorization data can include setting a cookie at the user agent, the cookie indicating at least a domain or hostname of the remote network resource.

The cookie can further indicate a unique identifier for the user agent.

Determining the resource access policy for the request can include determining a policy group associated with the remote network resource and the authorization data, and using the policy group to look up the resource access policy.

The method can further include determining a most restrictive policy as the resource access policy when determining that the request does not contain the authorization data.

The authorization token can represent a username, and the method can further include the authorization portal performing an authentication process with the user agent using the username.

The method can further include reading an authorization-portal cookie to determine whether a previous authentication remains valid, and, when the previous authentication remains valid, redirecting the user agent to the remote network resource with the authorization token.

The method can further include the authorization portal redirecting the user agent to the remote network resource with the authorization token as the authorized request.

The authorization token can include information contained in an HTTP header.

The authorization token can include a unique identifier known to both the authorization portal and a policy service that applies the resource access policy.

According to another aspect of the present disclosure, a system for applying network resource access policy includes a filter configured to apply resource access policy to a request from a user agent for access to a remote network resource by redirecting the user agent to an authorization portal when denying the request for the remote network resource. The filter is further configured to respond to an authorized request having an authorization token by storing authorization data at the user agent and redirecting user the agent to the requested network resource. The system further includes a policy server configured to determine resource access policy based on the request as provided by the filter and further based on any authorization data accompanying the request.

The filter can be configured to store the authorization data at the user agent by setting a cookie at the user agent, the cookie indicating at least a domain or hostname of the remote network resource.

The cookie can further indicate a unique identifier for the user agent.

The policy server can be configured to determine the resource access policy by determining a policy group associated with the remote network resource and the authorization data, and by using the policy group to look up the resource access policy.

The policy server can be configured to determine a most restrictive policy as the resource access policy when determining that the request does not contain the authorization data.

The authorization token can represent a username with which the authorization portal performs an authentication process with the user agent.

The policy server can be further configured to read an authentication-portal cookie to determine whether a previous authentication remains valid, and redirect the user agent to the requested remote network resource with the authorization token when the previous authentication remains valid.

The system can further include the authorization portal, and the authorization portal can be configured to redirect the user agent to the requested remote network resource with the authorization token.

The authorization token can include information contained in an HTTP header.

The authorization token can include a unique identifier known to both the authorization portal and the filter.

According to another aspect of the present disclosure, an authorization portal is configured to receive an authorization request from a user agent and to respond to the authorization request by determining a location of a remote network resource from the authorization request and redirect the user agent to the remote network resource with an authorization token indicating a unique identifier of the user agent. The unique identifier is known to a policy service configured to apply resource access policy to requests for remote network resources.

The authorization portal can be configured to provide the authorization token in an HTTP header when redirecting the user agent.

The unique identifier can represent a username, and the authorization portal can be configured to perform an authentication process with the user agent using the username.

BRIEF DESCRIPTION OF THE DRAWINGS

The drawings illustrate, by way of example only, embodiments of the present disclosure.

FIGS. 7-10 are tables showing a data structure of the policy service.

DETAILED DESCRIPTION

Figure 1:
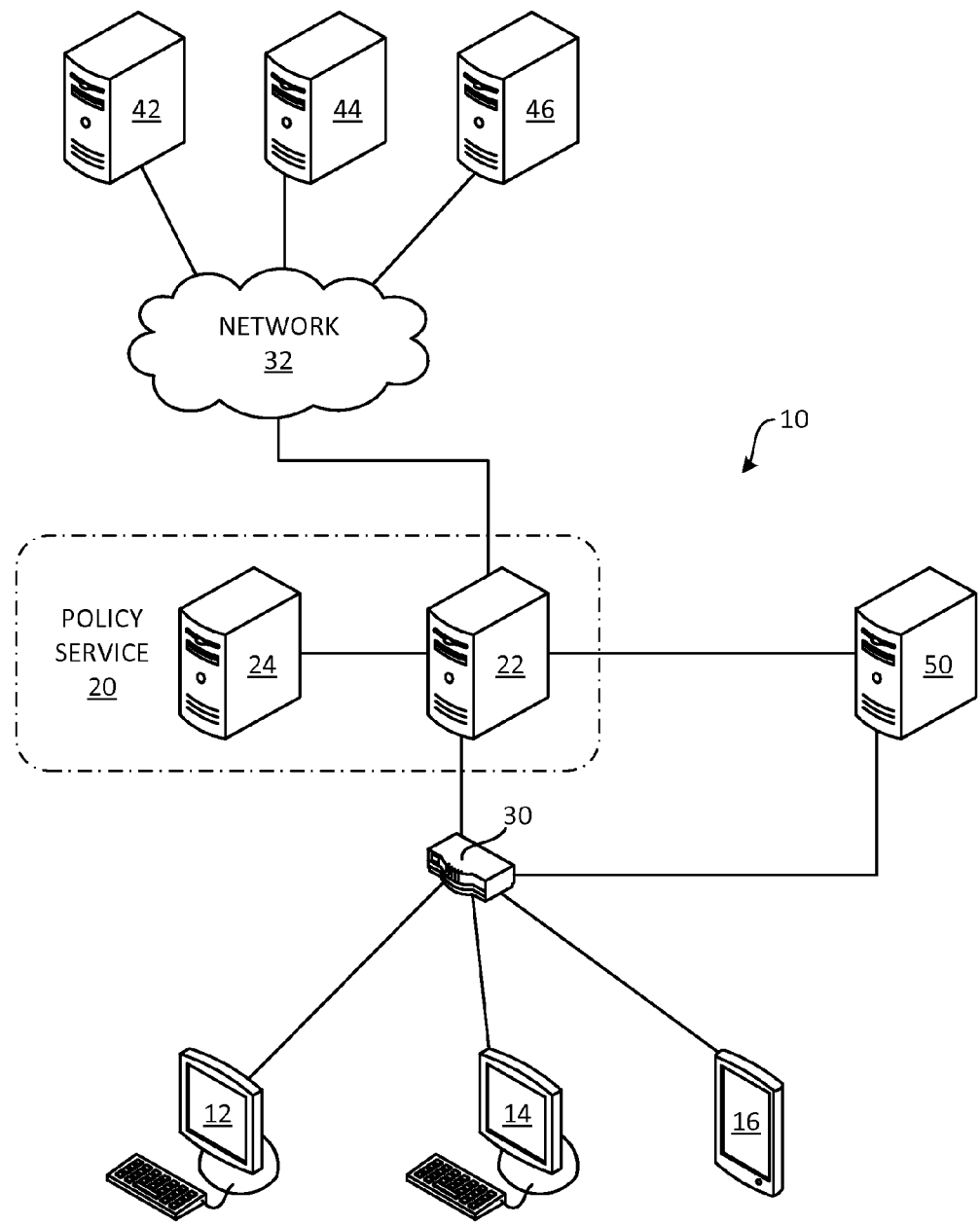
FIG. 1 is a diagram of a computer system according to an embodiment.

FIG. 1 is a diagram illustrating a computer system 10, in accordance with an embodiment of this disclosure.

The computer system 10 can include multiple client computers 12, 14, 16 connected to a policy service 20 via one or more network devices 30.

The policy service 20 can include various components such as a gateway server, a filter, a policy server, a message server, and a log server. For explanatory purposes, the policy service 20 will be described in terms of a filter 22 and a policy server 24. However, it should be understood that more or fewer servers can form the policy service 20, and that different processes and functions can be allotted to different servers in a myriad of ways. Functionality described herein with respect to several servers can be performed by fewer servers or even a single server, with any associated communications between physical servers described herein being configured instead as communications between processes. For example, the filter 22 and the policy server 24 can be implemented on different servers, the same server, or as process on a client computer 12, 14, 16.

In some embodiments, the filter 22 includes a layer 7 deep packet inspection (DPI) filter.

The one or more network devices 30 connect the client computers 12, 14, 16 to the policy service 20. The network devices 30 may include devices such as switches, hubs, routers, network cables, wireless access points, fiber-optic lines, and the like. In one example, the network devices 30 and client computers 12, 14, 16 define a network that may be a private intranet under the control and administration of an organization such as a corporation or institution, with the client computers 12, 14, 16 being workstations exclusively used by individuals belonging to such organization. Such a network may include the policy service 20. Alternatively, the policy service 20 may serve multiple different networks. Irrespective of the specific structure of the network, the network devices 30 provide for data communication between the client computers 12, 14, 16 and the policy service 20.

The policy service 20 connects the client computers 12, 14, 16, to a content network, generally indicated at 32. The content network 32 includes a plurality of routers and other network devices that provide for data communication between the filter 22 and sources of content, such as content servers 42, 44, 46. The content network 32 may further include additional network devices such as switches, hubs, routers, network cables, wireless access points, fiber-optic lines, and the like, but these are omitted from the figure for clarity and will not be discussed in detail. The network 32 can be the Internet.

Although the policy service 20 is depicted as located between the content servers 42, 44, 46 and the client computers 12, 14, 16, this is not necessary, as will be discussed below.

The content servers 42, 44, 46 are accessible to the client computers 12, 14, 16 and can include web servers, file transfer protocol (FTP) servers, streaming media servers, application servers, and the like. As such, the content resources available include web pages, files, streaming video and audio, network applications, and similar content. The content servers 42, 44, 46 operate at one or more host names (e.g., www.example.com).

The filter 22 is configured to process requests by the client computers 12, 14, 16 for access to remote network resources hosted on content servers 42, 44, 46. Such requests for remote network resources may include authorization data indicating that the request is from an authorized user agent of the client computer 12, 14, 16. Authorized user agents have undergone an authorization process that can include receiving a token and may further include an authentication process, such a username and password login process. Accordingly, access to the content servers 42, 44, 46 by the client computers 12, 14, 16 can be tracked, restricted, or both.

When the policy service 20 is configured to apply resource access policy to restrict access to content, then for each remote resource request, the filter 22 requests a policy decision from the policy server 24. The filter 22 passes a location of the remote resource, such as a URL, hostname, domain, etc, to the policy server 24 along with any authorization data received with the request. If the filter 22 receives an allowance from the policy server 24, then the filter 22 forwards the request to the network 32. If the filter 22 receives a denial from the policy server, the filter 22 redirects the request to an authorization portal 50.

The policy server 24 is configured to determine whether a restrictive resource access policy applies to the requested resource. Restrictive policy may be based on the identity of the user and the requested content, may be based on the requested content without regard to the identity of the user (e.g., all users are subject to the same policy), or may be group-based, such as described in WO2011/004258, which is incorporated herein by reference. In some embodiments, the policy server 24 stores a policy database that associates URLs and user identities to resource access policies (see FIGS. 7-10). In some embodiments, the policy database associates search keywords/phrases to policies. This allows fine-grained application of policy to content located at different URLs or content associated with certain search keywords/phases. The requested URL or keywords/phrases and authorization data, if provided, received from the filter 22 is then used in a database query to obtain any resulting policy.

In this embodiment, the policy server 24 is configured with a default resource access policy for all requests irrespective of user agent identity. The default policy is selected to the most restrictive and is applied to all user agents that have not been authorized. In some implementations, the default policy denies all requests for remote resources.

As mentioned, the filter 22 can be configured to redirect requests to an authorization portal 50 upon denial of a request for a remote resource.

The authorization portal 50 is configured authorize user agents of the client computer 12, 14, 16. The authorization portal 50 is further configured redirect a successfully authorized user agent to the requested resource with an authorization token as an authorized request.

The policy service 20 detects the token and processes token-bearing requests (authorized requests) by storing authorization data, such as a cookie, at the user agent and redirecting the user agent to the requested resource after stripping the token from the request. The policy service 20 uses the authorization data in any subsequent request to apply policy that may be less restrictive than the default policy, and this may result in access to the remote resource being allowed.

One advantage of this is that the authorization portal 50 and the policy service 20 can be operated by different organizations and can be on different domains. This can improve security, since any user credentials used by the authorization portal are kept within the authorization portal and can remain unexposed to the policy service.

As will be discussed in more detail below, the authorization portal 50 can redirect requests as authorized requests. Authorized requests can contain or reference unique identifiers, such as usernames or session keys, which can then be referenced by the policy service 20 when applying policy to authorized requests. A unique identifier may be provided in a token contained in an HTTP header provided when the authorization portal redirects the user agent to the requested resource. Such a header can be constructed using any HTTP method, such as HTTP GET or HTTP POST methods. Such a token can be grabbed by the policy service when the user agent makes the redirected request. The policy service can then use the unique identifier from the token to set a cookie at the user agent for the domain or hostname of the resource requested, so that the authorized user agent can access the remote network resource. In some embodiments, the cookie is set for the hostname of the request, so that further requests for content at the same hostname have the same policy applied automatically.

Figure 2:
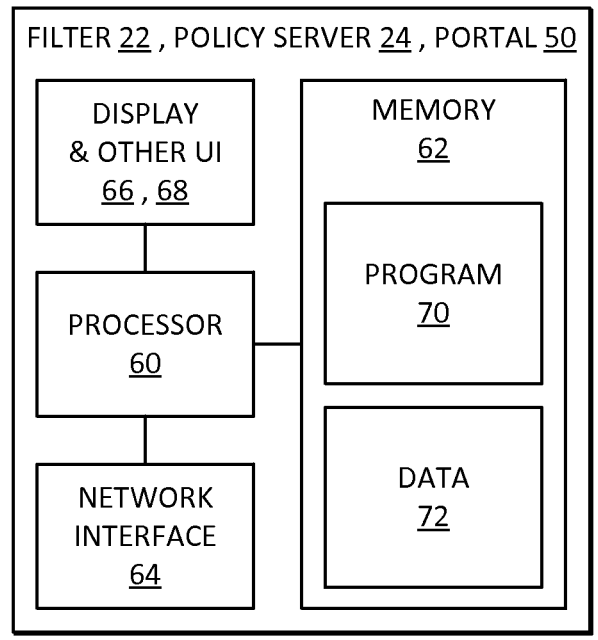
FIG. 2 is a diagram of a computer that can be used as the filter, policy server, and authorization portal.

FIG. 2 shows an example computer that can be used as any of the filter 22, policy server 24, and authorization portal 50.

The server can include a processor 60, memory 62, a network interface 64, and can further include a display 66 and other user interface components 68. The processor 60, memory 62, network interface 64, and display 66 and other user interface 68 are electrically interconnected and can be physically contained within a housing or frame. The server may be a computer such as a rack-mount server, blade server, tower server, or another kind of computer, or a process or program running on such a computer.

The processor 60 is configured to execute instructions, which may originate from the memory 62 or the network interface 64. The processor 60 may be known a central processing unit (CPU). The processor 60 can include one or more sub-processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the server (e.g., fixed hard drives) as well as removable components (e.g., removable memory cards). The memory 62 allows for random access, in that programs and data may be both read and written.

The network interface 64 is configured to allow the server to communicate with other computers across a network. The network interface 64 can include one or more of a wired and wireless network adaptor and well as a software or firmware driver for controlling such adaptor.

The display 66 and other user interface components 68, if provided, can include a display device, such as a monitor, a bank of light-emitting diodes (LEDs), or similar for monitoring operations of the server. The user interface 68 can include an input device, such as a keyboard, mouse, touch-sensitive element of a touch-screen display, or similar device. The user interface 68 can be remote to the server and provided via the network interface 64 to a client computer operated by a remote administrator.

Although the filter 22, policy service 24, and portal 50 may have similar components, as described above, each of the filter 22, policy server 24, and the portal 50 may be configured in a manner selected for its purpose as described elsewhere herein. For example, the policy server 24 may be configured for high storage capacity (e.g., much memory 62), while the filter 22 and authorization portal 50 may be configured for high processing speeds (e.g., multiple advanced processors 60).

One or more programs 70 can be provided to each of the filter 22, policy server 24, and portal 50 to carry out the processes described herein. Such programs 70 may reference data 72 in the form of databases, files, or other data structures.

Figure 3:
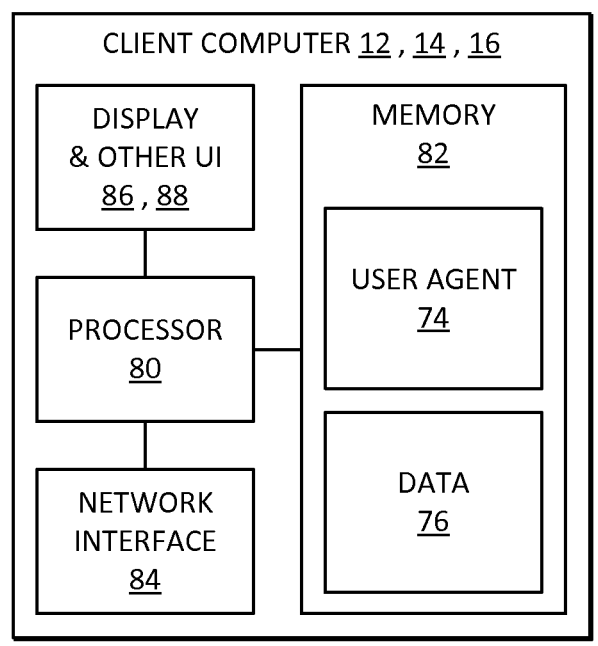
FIG. 3 is a diagram of a computer that can be used as a client computer.

FIG. 3 shows an example computer that can be used as any of the client computers 12, 14, 16. The computer includes a processor 80, memory 82, a network interface 84, and a display 86 and other user interface components 88. The processor 80, memory 82, network interface 84, and display 86 and user interface 88 are electrically interconnected and can be physically contained within a housing or frame. The client computers 12, 14, 16 may each be a computer such as a desktop computer, notebook computer, tablet computer, smart phone, netbook, video game or entertainment console, and the like.

The processor 80 is configured to execute instructions, which may originate from the memory 82 or the network interface 84. The processor 80 may be known a CPU. The processor 80 can include one or more sub-processors or processing cores.

The memory 82 includes a non-transitory computer-readable medium that is configured to store programs and data. The memory 82 can include one or more short-term or long-term storage devices, such as a solid-state memory chip (e.g., DRAM, ROM, non-volatile flash memory), a hard drive, an optical storage disc, and similar. The memory 82 can include fixed components that are not physically removable from the client computer (e.g., fixed hard drives) as well as removable components (e.g., removable memory cards). The memory 82 allows for random access, in that programs and data may be both read and written.

The network interface 84 is configured to allow the client computer 14, 16 to communicate with other computers across a network. The network interface 84 can include one or more of a wired and wireless network adaptor and well as a software or firmware driver for controlling such adaptor.

The display 86 and other user interface components 88 can include a display device, such as a monitor and an input device, such as a keyboard, keypad, mouse, touch-sensitive element of a touch-screen display, or similar device. Although the term "click" is used herein with respect to links (hyperlinks), this term should be taken to mean any user interface action that follows a hyperlink, such as a touch, tap-and-hold, and the like.

Each of the client computers 12, 14, 16 is configured to run a user agent, such as a web browser 74, suitable for the type of content being accessed. The web browser 74 may reference locally stored data 76, which can include cookies and similar information. Other examples of suitable user agent include a voice over IP (VOIP) client, a video chat client, and a file-sharing client, among others.

Figure 4:
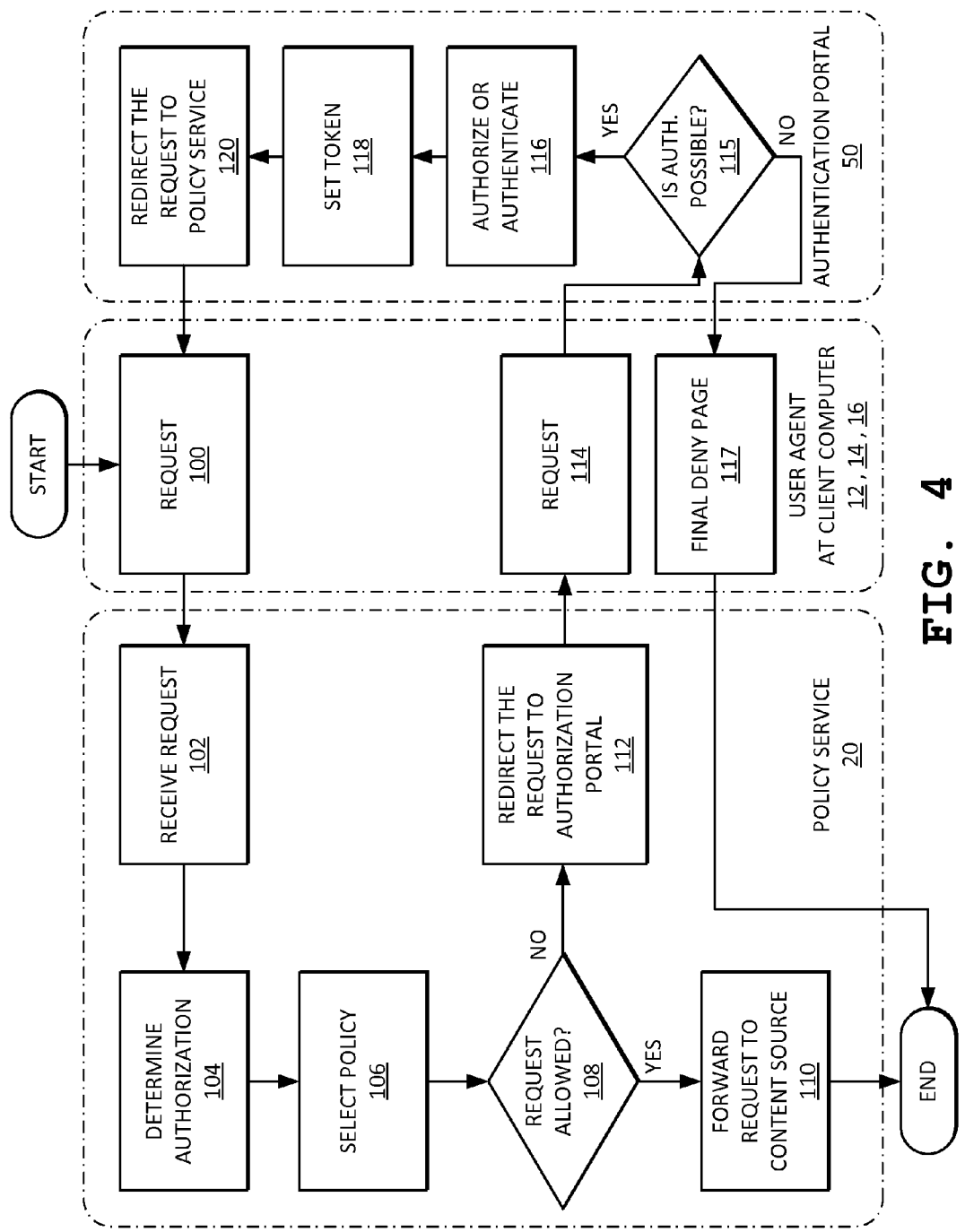
FIG. 4 is a flowchart depicting a process according to an embodiment of this disclosure.

FIG. 4 shows a flowchart of a process for applying network resource access policy. To aid understanding, the process is described with reference to the system of FIG. 1, but it should be apparent that other systems can be configured to implement the process.

At 100, a request for a remote network resource is made at a user agent of a client computer 12, 14, 16. The request designates the desired remote network resource and can include a URL or other identifier of the location of the resource. For example, a web browser at the client computer 12 is used by the user to click a hyperlink, and the URL of the hyperlink is sent by the web browser to the policy service 20, as a request for access to the webpage at the URL (e.g., http://www.example.com/badpage.htm).

At 102, the request is received at the policy service 20. In some embodiments, the filter 22 is located between the user agent and the requested resource and intercepts requests. In other embodiments, the filter 22 is not in line with the request and may receive a mirrored copy of the request from a gateway or other server handling the request.

At the policy service 20, at 104, the filter 22 processes the request and determines whether the request is from a user agent that has been authorized. The filter 22 obtains authorization data specific to the remote network resource, when the request contains such data. In some embodiments, the filter 22 examines a cookie or other data sent by the user agent as part of the request. Cookies or other state data from the user agent may be used, particularly when the client computers 12, 14, 16 share an endpoint address (e.g., an IP address). In embodiments where the client computers 12, 14, 16 have their own addresses, the filter 22 can also reference an IP address associated with the request to determine whether the IP address has been authorized. In various embodiments, state data, such as cookies, and endpoint address checking can be used independently, in combination, or in combination with other techniques.

With the authorization, or lack thereof, determined, the policy service 20 selects policy to apply to the request, at 106. A highly restrictive default policy may be used for any and all requests that do not contain authorization data or contain malformed authorization data. For authorized requests, the authorization data can be matched to a group for which a common group-based policy is applied. That is, unique identifiers are mapped to groups, and for each request the group of a unique identifier contained in the authorization data is determined and used to select the policy that will be applied to the request. For example, in a scenario where client computers 12, 14, 16 are located in school system, groups can include students, teachers, administrative staff, support staff, and IT staff, where each group can be provided with different remote resource access policy.

Thus, selecting policy can be based on assigning the user agent to a policy group based on successful authentication of the user agent using credentials specific to the user or to the group. In some embodiments, such a policy group defines a resource access policy that is less restrictive than a default policy that is selected before authentication is performed or when authentication is unsuccessful.

The selected policy is applied, at 108, to allow or deny the request for the remote resource. If the request for the remote resource is allowed, then the request is forwarded, at 110, to the hosting content server 42, 44, 46. The requested resource (e.g., webpage, chat message, video, audio, etc.) is then returned to the requesting client computer 12, 14, 16 (e.g., the page at http://www.example.com/badpage.htm is returned).

If the request for the remote resource is denied, then the user agent is redirected, at 112, to the authorization portal 50. This can be achieved by the policy service 20 issuing an HTTP redirect response (i.e., a 300-series status code, such as 302), a server-side script executed at the filter 22 that writes appropriate HTTP headers, or similar technique.

A request to the authorization portal 50 can include parameters defining the request. Such parameters can be provided as HTTP header data. An example of such a request is as follows:

http://www.authportal.com?url=http://www.example-.com/badpage.htm.

where the authorization portal 50 is located at http://www.authportal.com and the requested resource at 100 is http://www.example.com/badpage.htm.

Additional information can be supplied with the request to the authorization portal 50, such as information pertaining to the policy decision for the request. The authorization portal 50 can be configured to display such information to the user to inform the user the reason for authentication or to inform the user as to the reason for denial. Such additional information can include any of a category of the requested resource (e.g., malware, pornography, etc.), an expiry time for the category when categorization is ongoing, a policy group name (e.g., teachers, students, etc), a policy name, a username, an IP address of the user agent, a policy service host name, a protocol (e.g., HTTP, FTP, etc), a language (e.g., English, French, etc) for displaying any notification regarding the policy and requirement to authenticate.

At 114, the user agent receives the redirection and connects to the authorization portal 50, as indicated in the redirected request. That is, with reference to the above example, the user agent points to http://www.authportal.com?url=http://www.example.com/badpage.htm.

Upon receiving the redirected request, it is determined whether authorization or authentication is possible or not, at 115. This determination can be made by, for example, type of deny page served, and specifically, whether the deny page permits authorization or authentication.

If the request for the remote resource is denied and authorization determined to not be possible, at 109, then the user agent is redirected to a final deny page, at 117. The final deny page can be configured to inform the user that the request has been denied, and that there is no option to authorize or authenticate. The final deny page can include a relevant policy notification indicating the reason for denial, and can include information discussed above (e.g., policy group name, category, etc). The final deny page can be hosted by the authentication portal, or another server, and may contain one or more links to other content. The final deny page may be a login page that is configurable to display a final denial and disable a login form.

When authorization or authentication is determined to be possible, at 116, the authorization portal 50 performs an authorization process or an authentication process. Generally, as discussed herein, an authorization process does not try to verify the identity of the user at the user agent, but rather simply aims to count or track access to remote network resources. An authentication process, on the other hand, attempts to at least partially verify the user's identity (e.g., username, user group, specific individual user).

In some embodiments, the authorization process results in all request being authorized. In some embodiments, the authorization process includes providing a message, such as a warning, to the user and awaiting an acknowledgement. In some embodiments, the authorization processes sets a cookie at the user agent to track the user agent. In some embodiments, the authorization process authorizes the user agent based on criteria such as IP address, physical location, hardware capabilities, and the like.

In some embodiments, the authentication processes includes the portal 50 responding to the user agent with an authentication request, such as a request for credentials. The response can include a webpage, such as a login webpage. The authentication request can include the location of the originally requested resource (e.g., http://www.example.com/badpage.htm), as well as any additional information regarding the policy. The user agent is prompted for credentials, such as a username and password combination, a digital certificate, or similar. The user at the requesting client computer 12, 14, 16 provides the requested credentials to authenticate with the authorization portal 50. In one example, the authorization portal 50 requests a username and password and compares an entered username and password to a database storing valid credentials. If the username and password combination are found in the database, then the user at the user agent is successfully authenticated. Otherwise, the user authentication has failed, though several attempts may be permitted.

At 118, an authorization token is set for the user agent at the end of the authorisation process or if the authentication process is successful.

Afterwards, the request is redirected, at 120, as an authorized request. Redirection can be achieved by any of the techniques described elsewhere herein, such as a 300-series response. Redirection includes redirecting the user agent of the requesting client computer 12, 14, 16 to the initially requested resource with the token, which may be provided as HTTP header data using the get or post methods. Continuing the above example, the authorization portal 50 can redirect the user agent to:

http://www.example.com/badpage.htm?policyservice=token where the token contains a unique identifier, such as the username or group name of an authenticated user, a session key for a tracked user, or other relatively unique identifier. For example, the parameter "policyservice" may be set to "judymeyers" when the user Judy Meyers has successfully authenticated. In some embodiments the token includes additional information, such as a domain or host for which the authentication is valid and an expiry time. For example, the token may be a string as follows:

policyservice=USERNAME; expires=TIMESTAMP; path=/; domain=DOMAIN where USERNAME is set to the username of an authenticated user; TIMESTAMP is set to the expiry time for the authentication; and DOMAIN is set to the domain or hostname for which the authentication is valid.

In another example of a token, a relatively unique session key is provided:

policyservice=09AF0199

The token string can be encoded and formatted for use in a cookie. Alternatively, the token string can be formatted in another way. The token can be encrypted using a secret shared by the policy service 20 and the authorization portal 50. Any type of suitable encryption or encoding scheme can be used, such as using XOR encoding, using Blowfish cipher encryption, and the like.

At about the same time, the authorization portal 50 can set state data, such as another cookie, at the user agent of the requesting computer 12, 14, 16. Such an authorization-portal cookie is for the hostname (e.g., www.authportal.com) of the authorization portal 50 and indicates to the authorization portal 50 that another credential verification is not needed for the user for a specified time. For example, such a cookie can have the following data:

policyservice=USERNAME
policyserviceexpires=EXPIRETIME where USERNAME is set to the username of the authenticated user; and EXPIRETIME is set to a duration or future time, after which the user will have to revisit the authorization portal 50.

Regardless of how formed and how provided (e.g., GET or POST), the token is provided with the redirection at 120.

At 100, in response to redirection by the authorization portal 50, the user agent attempts to obtain the requested resource. This results in the policy service 20 receiving the request at 102 and determining authorization at 104, as discussed above.

Further, the policy service 20 is configured to detect any token accompanying a request. When the policy service 20 detects a token, the policy service 20 can set a cookie or other state data at the user agent of the requesting computer 12, 14, 16. The cookie includes authorization data, such as the unique identifier (e.g., username, session key, group name) and a location of the resource (e.g., host, domain). Subsequent requests by the user agent to an authorized host or domain will thus include the relevant cookie. The policy service 20 is configured to read the authorization data contained within the cookie and determine policy to apply to the request.

The policy service 20 may be configured to handle authorized requests bearing tokens by redirecting the user agent to the initially requested URL (without the token as a parameter, e.g., http://www.example.com/badpage.htm) after setting the cookie at the user agent.

Any request to the policy service 20 that includes an unexpired cookie can be considered an authorized request for the host or domain identified in the cookie. The policy service 20 selects policy based on the authorized request and the request is either allowed and forwarded to the content source at 108, 110 or is denied and redirected to the authorization portal 50. The policy service 20 redirects denied requests to the authorization portal 50. Further, the policy service 20 can check any authorization-portal cookie set by the authorization portal 50 before forwarding denied and redirected requests to the authorization portal 50, so as to advantageously prevent sending redundant requests to the authorization portal 50.

Thus, it should be apparent from the above that a user agent is redirected for authorization whenever a request is denied. Hence, policy is applied for hosts/domains on a per-request basis and each denial provides an opportunity for a user to authenticate, if required, which when successful may move the user to a policy group that is less restrictive. In a school scenario, a student using the Web for a project may initially be denied access to the Web by a completely restrictive default policy. The student's request is redirected to the authorization portal and the student can sign in using her username and password. The request may then be allowed when made by the authenticated student, and the student may browse the requested material and other material on the same host until, for example, following a link to a webpage at another host that has a deny policy for the group "students". The request for such webpage is thus redirected to the authorization portal, which is configured to authenticate users based on username and password. The student may then ask her teacher for help, and the teacher may log in with his credentials. If the resource is permitted for the policy group "teachers", then the teacher can control the user agent to access the host of the remote resource that was denied to the student. Thus, policy can be applied on the basis of groups (teachers, students, staff, etc.) and hosts for each request.

Figure 5:
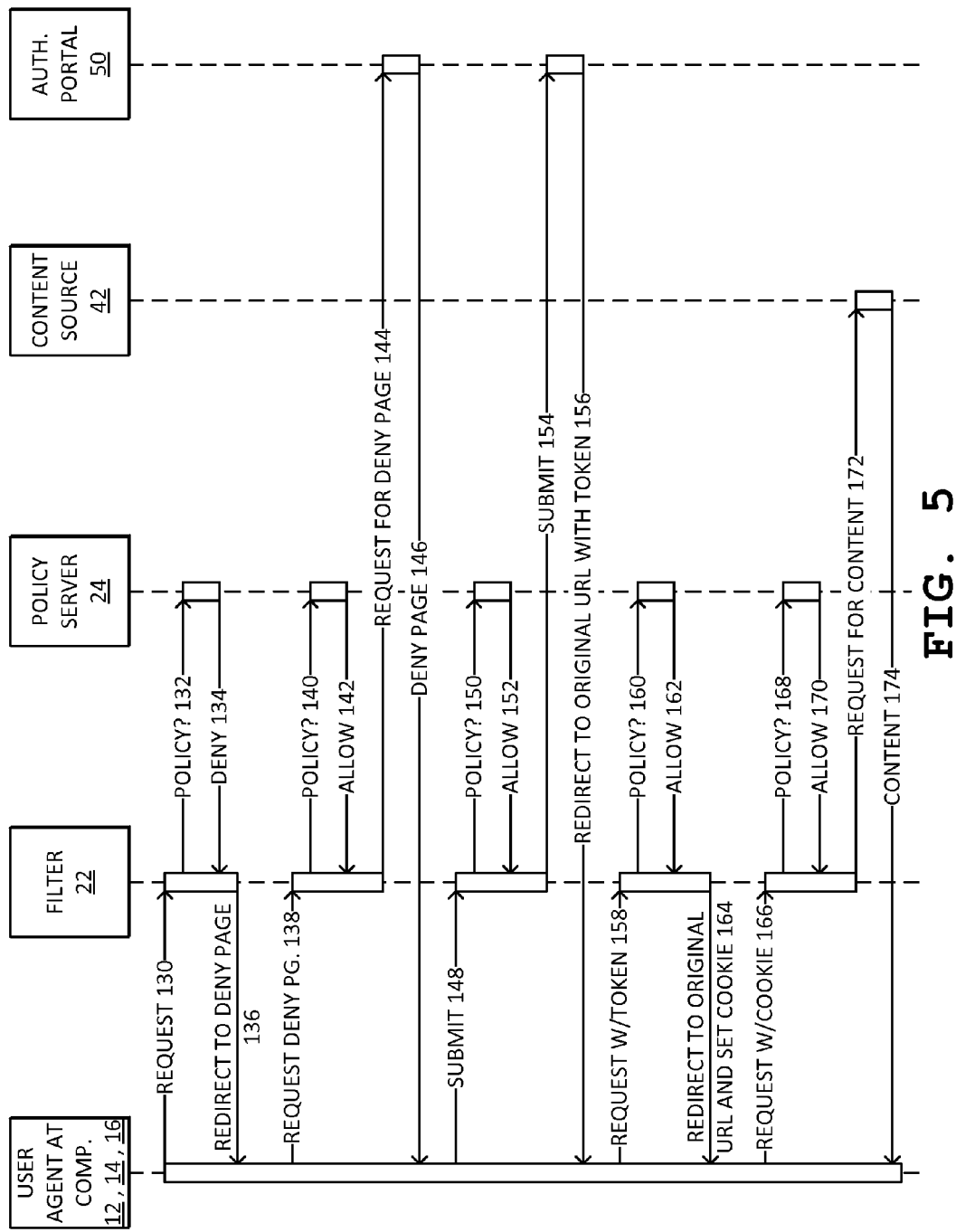
FIG. 5 is a sequence diagram illustrating responses and requests according to an embodiment.

FIG. 5 shows an example of a process of accessing a remote network resource. To aid understanding, the process is described with reference to the system of FIG. 1, but it should be apparent that other systems can be configured to implement the process. Further, the process of FIG. 4 can be referenced for further detail.

At 130, a user agent of a client computer 12, 14, 16 makes an initial request for a remote network resource, such as a webpage. The filter 22 of the policy service 20 is configured to receive all such requests, whether as interceptions or mirrored requests, to apply policy and allow or deny requests accordingly. In this example, the filter 22 requests a policy decision at 132 from the policy server 24 and the policy server 24 responds with a policy response 134 indicating a deny decision because the request does not contain suitable authorization data in a cookie or does not contain authorization data at all.

The response 134 contains a location of a deny page hosted by the authorization portal 50. The filter 22 redirects, at 136, the user agent to the deny page. In other words, the policy service 20 informs the user agent that the desired resource is to be obtained from the authorization portal 50.

The user agent then requests the deny page, at 138, and such request is allowed by the policy service 20 at 140, 142. The request is thus forwarded to the authorization portal 50 at 144, which responds with the deny page at 146. The deny page request 144 can include information as to policy and why the resource was denied, as discussed elsewhere herein, so that the authorization portal 50 can construct an informative deny page 146, if desired.

In addition, to facilitate informing the user of policy or tracking policy decisions, the policy service 20 can store, at 132 or 134, details about the denied request to use at 144. This prevents such details from having to accompany the redirect 136 and potentially exposing such details to the user agent.

The user at the user agent submits a response to the deny page, at 148, and such response can include credentials (e.g., username and password) for authentication, a simple confirmation (e.g., accepting terms of service), or other suitable response.

As with the other requests for remote resources, the submission 148 is subject to policy and is allowed at 150, 152. The submission is forwarded, at 154, to the authorization portal 50, which responds with a redirection to the original location of the requested resource and an authorization token, at 156.

The user agent follows the redirect at 158. The filter 22 is configured to detect the token in any request and process such requests by stripping out the token and sending the request, at 160, to the policy server 24 for a policy decision 162. Alternatively, the token may be left in the policy request 160 to be processed by the policy server 24 as part of the policy decision 162. In this example, the token contains a unique identifier (e.g., username, group name, etc) that results in an allow decision, at 170.

In response, the filter 22 redirects the user agent to the originally requested resource, at 164, while injecting a cookie that appears (to the user agent) to originate from the originally requested resource. This advantageously bypasses any third-party cookie restriction at the user agent.

The user agent then follows the redirect to the originally requested resource, at 166, and provides the cookie when doing so. Policy is applied to the request as usual, at 168, 178. However, the presence of authorization data in the form of the cookie affects the policy applied. A username or other unique identifier present in the authorization data is provided in the policy request 168. Thus, the policy response 170 may be different from the policy response 134 that did not contain suitable authorization data. If this request were to also be denied, then the filter 22 would respond to the user agent with a redirection to a deny page, as similar to at 136. However, if the policy decision is an allow decision, as illustrated at 170, then the request is forwarded at 172 to the content server 42.

The content server 42 then responds to the user agent with the requested content, at 174.

Subsequent requests to the same host or domain as covered by the cookie are then handled as in 166-174. This can advantageously allow the user to browse the authorized host or domain without having to authorize or authenticate for each resource on that host or domain.

In the case where the authentication is requested and not completed successfully, then a final denial page is provided by the authorization portal 50 instead of the redirection 156. Requests/responses 138-156 can be repeated until authentication is determined to be successful or not.

Also at 156, the authorization portal 50 can provide an authorization-portal cookie to the user agent. For subsequent requests, the policy server 22 can inspect the authorization-portal cookie when the cookie accompanies requests for deny pages, at 138, and subsequent policy requests at 140. If the policy server 22 determines from the authorization-portal cookie that a previous authentication remains valid (e.g., it has not yet expired), then the policy server 22 can construct the token and provide the redirection, at 156, on behalf of the authorization portal 50. This can prevent saturating the authorization portal 50 with redundant requests when a previously authenticated user agent makes a request that would have triggered another authorization request (e.g. the user browses to a new host or domain).

It should be noted that only outbound requests made by the user agent are processed by the filter 22 and have policy applied by the policy server 24. Responses, whether from the content source 42 or the authorization portal 50, do not go through the policy service 20. This advantageously allows the filter 22 and policy server 24 to be located anywhere in the network. A proxy is thus not required, and this is beneficial because proxies that enforce policy tend to introduce latency into the system, require setup and maintenance, reduce the speed at which content can be accessed, and may consume additional bandwidth.

Another advantage is that a typical user agent can be used. No special programming need be provided to the user agent. The user agent need only respond to redirects in the expected manner. In effect, the user agent follows redirects and accepts and sends cookies, as is well known, without being aware as to the purpose of the redirects.

Figure 6:
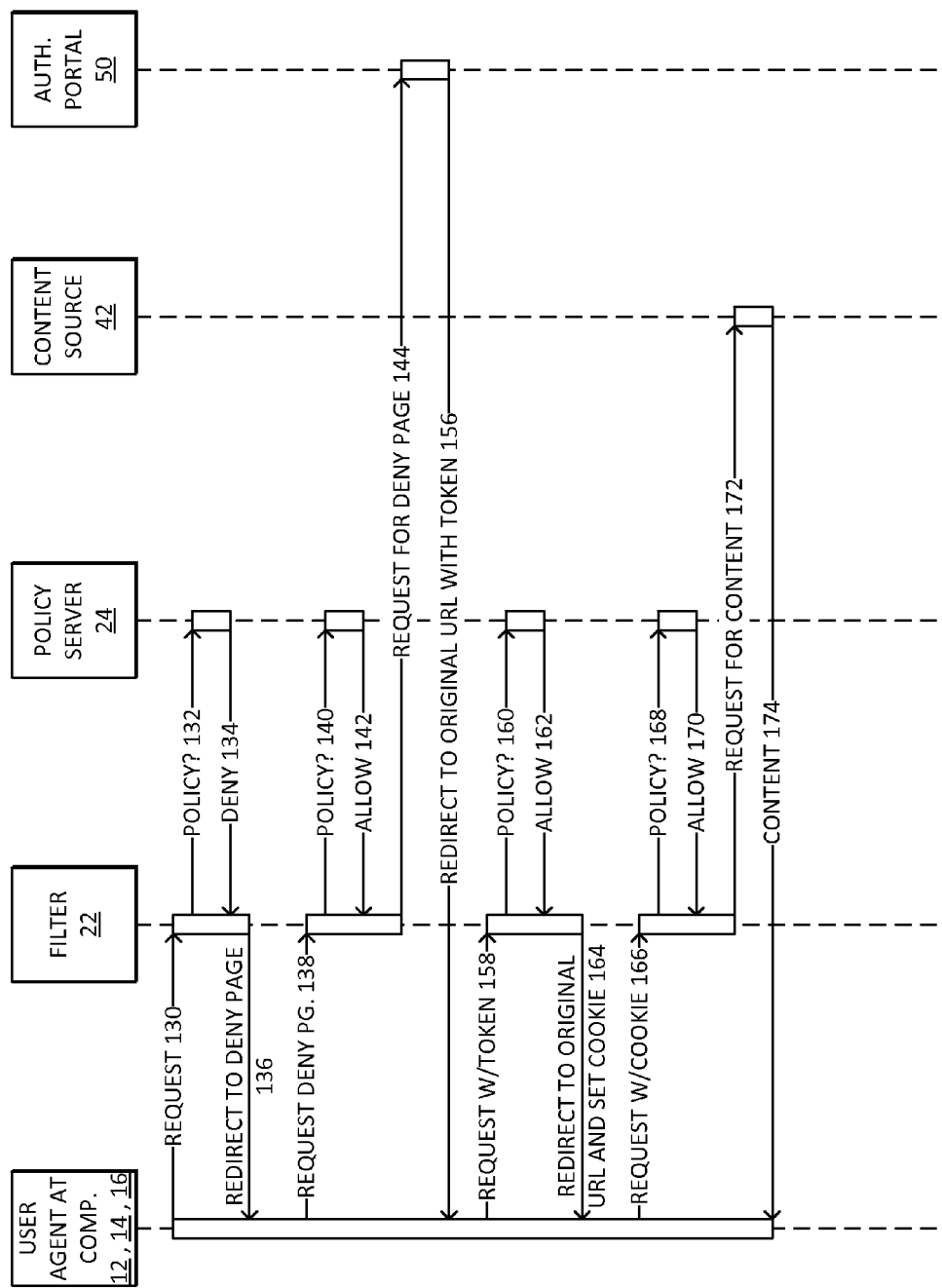
FIG. 6 is another sequence diagram illustrating responses and requests according to another embodiment.

FIG. 6 shows a process similar to FIG. 5. Like reference numerals may be referenced for like description.

In this embodiment, the authorization portal 50 does not provide a deny page, but instead simply provides a redirection with token at 156. The authorization portal 50 thus does not perform authentication of the user. Rather, the authorization portal 50 simply tracks requests or responds with the redirection 156 when the request meets some predetermined criteria, such as IP address, etc, as discussed elsewhere herein.

As can be seen, the process of FIG. 6 is substantially the same as the process of FIG. 5, except that requests/responses 146-154 are not performed. Instead, the deny page at the URL requested at 144 can be a script file or other entity that processes the request and, if appropriate, generates a token and responds with the redirect and token at 156.

FIGS. 7-10 illustrate a data structure for mapping resources (e.g., URLs) to policy and further to authorization portals. Data provided according to the data structure can be stored in the policy service in databases or like storage elements, as data 72 (FIG. 2).

FIG. 7 is a table of remote network resource locations (e.g., URLs) 200 associated with categories 202 for the content hosted at such locations. Each location 200 stored can include one or more of a hostname, domain, protocol, port number, wildcards, and similar information. For example, a specific webpage (e.g., http://www.example.com/badpage.htm) can be identified by a location, as can a domain (e.g., *.goodsite.com, where * is a wildcard that matches anything). In another example, all pages at a domain can be identified using wildcards (e.g., http://www.authportal.com/*). Each location 200 is mapped to a category 202 that defines the nature of the content at the location for filtering purposes.

FIG. 8 is a table of usernames 204 mapped to groups 206, which can facilitate group-based policy. FIG. 9 is a table of groups 206 mapped to categories 202 and the resulting policies 208. Accordingly, users that belong to a given group have the same policy applied when requesting resources of the same category. For example, if the student "judymeyers" requests any resource at "goodsite.com" (with any protocol), the request will be allowed because the category "crafts" of the location is allowed for the group "students".

FIG. 10 is a table that maps groups to authorization policy. A deny page location 210 determines where to redirect user agents based on the group of the user associated with the user agent. As can be seen, user agents not associated with any group are sent to a first authorization portal and users of the group "teachers" are sent to a second authorization portal. Users of the group "staff" are sent to a deny page that can be configured to not allow authentication, and this is an example of a final deny page as discussed with respect to FIG. 4.

Thus it can be seen that locations of resources are mapped to policy via user groups and further mapped to authorization portals based on user group. Policy can thus be looked up for the requested resource and the group of the requesting user. However, the above is simply an example, and other data structures can be used instead.

Figure 11:
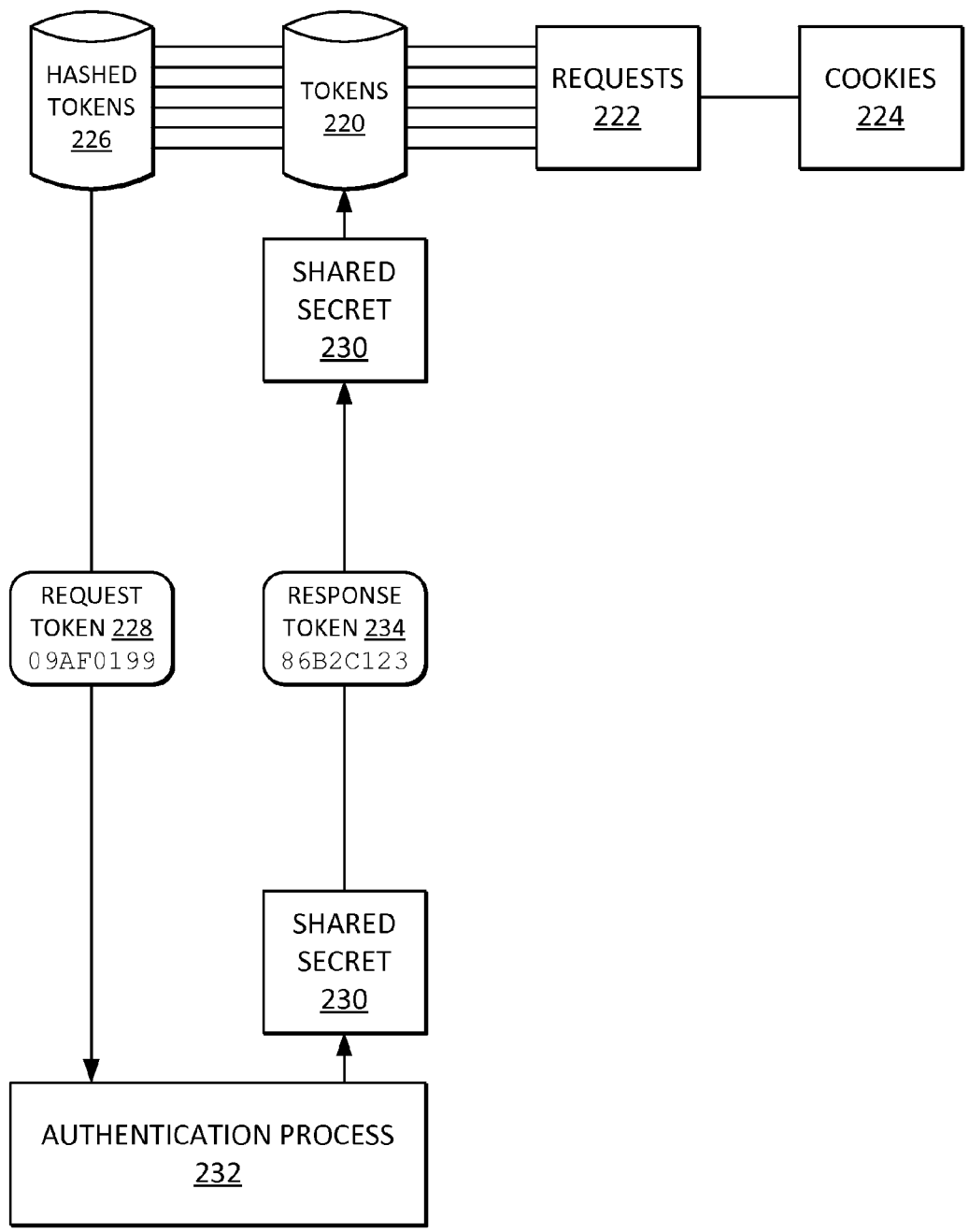
FIG. 11 is a schematic diagram of a process of using tokens.

FIG. 11 shows a schematic diagram of using encrypted or hashed tokens to prevent modification of GET or POST tokens passed between the policy service 20 and the authorization portal 50.

The policy service 20 assigns tokens 220 to requests for remote network resources. Tokens 220 can be pre-generated and assigned to requests pseudo-randomly. Alternatively, tokens 220 can be generated specific to information contained in the requests 222, such as the username of the requesting user, the location (URL) of the requested resource, the domain or hostname, and the like. The tokens 220 can be as unique as practical to the combination of user and requested resource, as far as policy is applied. It may be enough in some implementation to represent hostname or domain as the token. Authorization data represented by or contained in the tokens 220 can be stored in cookies 224 at authorized user agents. In some examples, the cookies 224 store the tokens 220 themselves.

Thus, when a request is made by a user agent and such request includes a non-expired cookie bearing authentication data, the policy service 20 can map the authentication data to a token 220 and obtain the username and location (e.g., hostname, domain, resource) that is authorized.

When the policy service 20 redirects the user agent to the authorization portal 50, the policy service 20 can include, as a GET or POST variable for example, a hashed version of the token 220 that identifies the request. The hashed token 226 can be obtained using any algorithm, such as those described elsewhere herein. Any suitable hashing or encryption technique can be used. The policy service 20 and the authorization portal 50 have knowledge of the algorithm as a shared secret 230.

The authorization portal 50 receives the hashed token as a request token 228 from the user agent after as user agent is redirected to the authorization portal 50. The authorization portal 50 conducts the authentication process 232 and, if successful, processes the request token 228 into a response token 234 using the shared secret 230.

Then, the authorization portal 50 redirects the user agent to the originally requested resource with the response token 234 as the authorization token, as discussed elsewhere herein.

The policy service 20 receives the request from the user agent along with the response token 234 and applies the shared secret 230 to the response token to obtain something that can be compared to the original tokens 220. If a matching original token 220 is found, then the policy service 20 knows that the request has been authenticated and that the requested resource should be provided.

Thus, the token and its hashed counterpart act as a unique identifier known to both the policy service 20 and the authorization portal 50.

The process of FIG. 11 advantageously prevents token and cookie spoofing by users who wish to avoid the application of policy.

Figure 12:
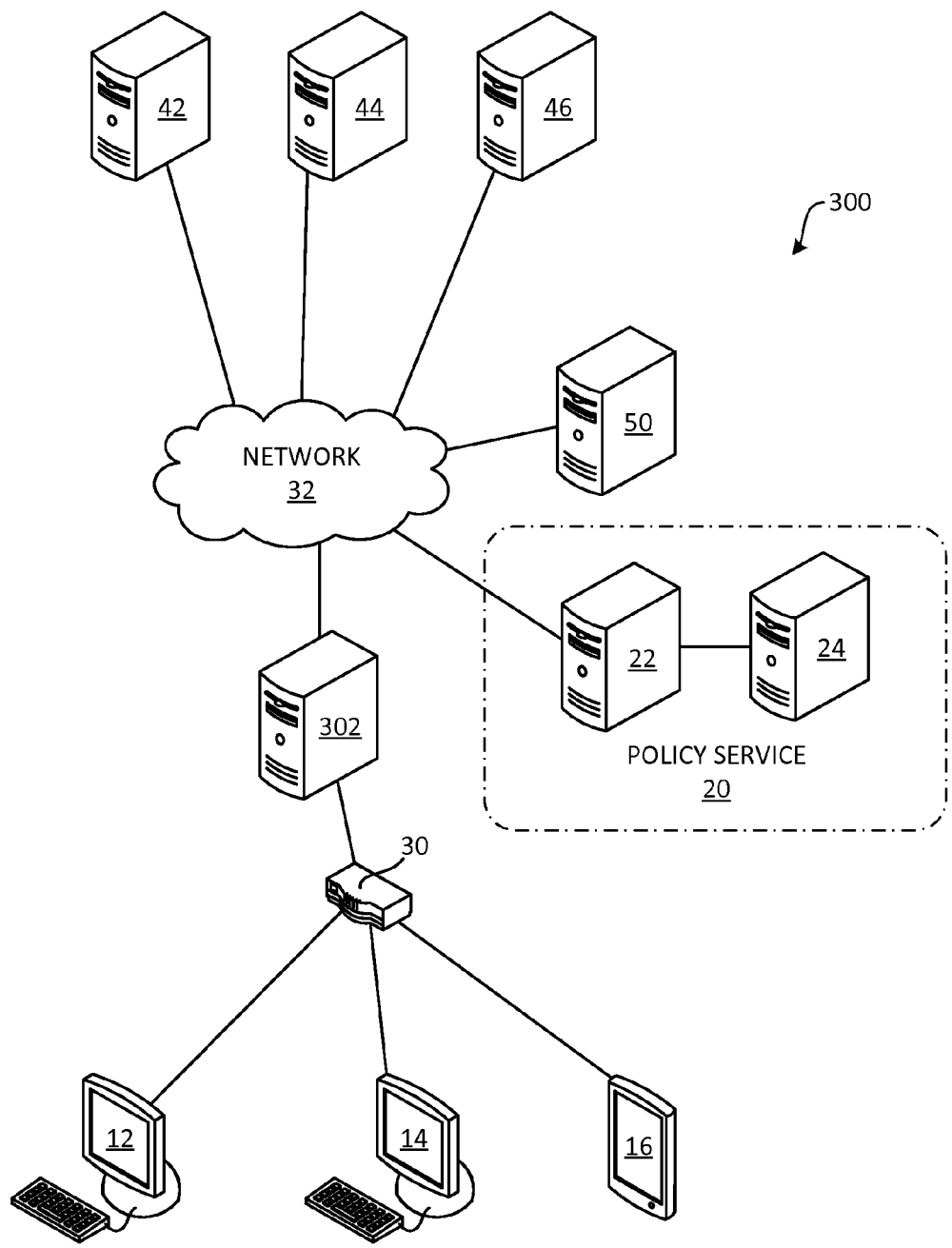
FIG. 12 is a diagram of another computer system according to another embodiment.

FIG. 12 illustrates a computer system 300. The system 300 is similar to the system 10 and the above description may be referenced, with like elements having like reference numerals.

In the system 300, the client computers 12, 14, 16 access the network 32 and thus the content servers 42, 44, 46 via a gateway server 302.

The gateway server 302 may be provided and administered by an organization, such as a school system, government, telecom service provider, company, or the like, that provides network access to the client computers 12, 14, 16. The gateway server 302 handles requests and responses to the client computers 12, 14, 16 and maps the client computers 12, 14, 16 to shared IP addresses, if required.

The gateway server 302 is configured to make policy requests to the out-of-band policy service 20. In some embodiments, all requests for external resources are mirrored to the policy service 20. Because the filter 22, as discussed elsewhere herein, is configured to redirect user agents of the client computers 12, 14, 16 to URLs that appear as redirects from the requested host/domain, the gateway 302 will provide incoming redirects from the filter 22 to the user agents as responses from the requested host/domain. The response speed of the policy service 20 is configured to beat the actual response of the requested host/domain, so that the gateway 302 ignores or discards the actual response of the requested host/domain.

The authorization portal 50 can be generally accessible on the network 32, as depicted, or can be specific to the organization running the gateway server 302.

Once the user agent has been redirected by the filter to the authorization portal 50, the user agent can be queried for credentials or tracked, as discussed elsewhere herein. Eventually, the user agent is redirected to originally requested resource, and makes such request with the cookie provided by the policy service 20. The cookie, if not expired, causes the policy service 20 to allow the request which is then forwarded to the actual domain/host, which returns the requested content to the user agent.

Advantages of the techniques described in this disclosure have been mentioned above, however, it is worth repeating that the policy is applied to requests and not to responses. Policy is applied to requests, whereas responses are generated to control where and how users are routed for denial and authorization or authentication. This improves the speed at which policy can be effected and allows the policy service to be out-of-band with respect to the requesting computers and the requested content, while still providing for authorization or authentication. Further, the authorization portal can be located with the policy service or in a completely different network under the control of a different organization. This allows increased flexibility in how policy is applied and how users are authorized or authenticated.

The present invention relates to a DPI filter that does not act on behalf of the user or originating requests. This is in contrast to a proxy, which acts as a surrogate for application data. Use of a DPI filter, as discussed herein, allows monitoring of traffic and denial of inappropriate content, but does not otherwise influence network traffic, as is the case with proxies. This makes it possible to monitor all traffic, even traffic for which the DPI filter cannot as surrogate for lack of sufficient knowledge about such traffic. Authorization and authentication of content requests can thus be performed using redirects, as described herein, regardless of the position of the DPI filter in the network and the knowledge that the DPI filter has (or lacks) of the traffic.

While the foregoing provides certain non-limiting example embodiments, it should be understood that combinations, subsets, and variations of the foregoing are contemplated. The monopoly sought is defined by the claims.

What is claimed is:

1. A method of applying network resource access policy, the method comprising:
   receiving from a user agent a request for a remote network resource, the request being adapted to contain authorization data specific to the remote network resource;
   obtaining from the request authorization data specific to the remote network resource when the request contains the authorization data;
   determining a resource access policy for the request using the authorization data and a shared secret, wherein the shared secret is shared by a policy service and an authorization portal;
   excluding the user agent from the shared secret;
   preventing modification of tokens passed between the policy service and the authorization portal;
   comparing the authorization data to assigned tokens and, if the authorization data matches one of the assigned tokens, determining the resource access policy to allow access by the user agent to the remote network resource;
   applying the resource access policy to allow or deny access by the user agent to the remote network resource;
   when denying access to the remote network resource, generating a request token using the shared secret and redirecting the user agent to the authorization portal, the redirection containing the request token;
   after authorization by the authorization portal, receiving from the user agent an authorized request for the remote network resource, the authorized request including an authorization token generated by the authorization portal using the shared secret; and
   in response to receiving the authorized request including the authorization token, storing the authorization data specific to the remote network resource at the user agent and redirecting the user agent to the remote network resource to cause the user agent to make another request for the remote network resource.

2. The method of claim 1, wherein storing the authorization data comprises setting a cookie at the user agent, the cookie indicating at least a domain or hostname of the remote network resource.

3. The method of claim 2, wherein the cookie further indicates a unique identifier for the user agent.

4. The method of claim 1, wherein determining the resource access policy for the request comprises determining a policy group associated with the remote network resource and the authorization data, and using the policy group to look up the resource access policy.

5. The method of claim 1, comprising determining a most restrictive policy as the resource access policy when determining that the request does not contain the authorization data.

6. The method of claim 1, wherein the authorization token represents a username, the method further comprising the authorization portal performing an authentication process with the user agent using the username.

7. The method of claim 6, further comprising: reading an authorization-portal cookie to determine whether a previous authentication remains valid; and when the previous authentication remains valid, redirecting the user agent to the remote network resource with the authorization token.

8. The method of claim 1, further comprising the authorization portal redirecting the user agent to the remote network resource with the authorization token as the authorized request.

9. The method of claim 1, wherein the authorization token includes information contained in an HTTP header.

10. The method of claim 1, wherein the authorization token includes a unique identifier known to both the authorization portal and the policy service that applies the resource access policy.

11. A system for applying network resource access policy, the system comprising: a filter configured to apply resource access policy to a request from a user agent for access to a remote network resource by redirecting the user agent to an authorization portal when denying the request for the remote network resource, wherein the request is adapted to contain authorization data specific to the remote network resource, and wherein the filter is further configured to respond to an authorized request having an authorization token generated using a shared secret by storing authorization data at the user agent and redirecting the user agent to the requested network resource; and a policy server configured to determine resource access policy based on the request as provided by the filter and further based on any authorization data contained in the request, the authorization data being specific to the remote network resource, the policy server configured to:
  determine a resource access policy for the request using the authorization data and a shared secret, wherein the shared secret is shared by a policy service and an authorization portal;
  exclude the user agent from the shared secret;
  prevent modification of tokens passed between the policy service and the authorization portal;
  compare the authorization data to assigned tokens and, if the authorization data matches one of the assigned tokens, determine the resource access policy to allow access by the user agent to the remote network resource;
  apply the resource access policy to allow or deny access by the user agent to the remote network resource;
  when denying access to the remote network resource, generate a request token using the shared secret and redirect the user agent to the authorization portal, the redirection containing the request token;
  after authorization by the authorization portal, receive from the user agent an authorized request for the remote network resource, the authorized request including an authorization token generated by the authorization portal using the shared secret; and
  in response to receiving the authorized request including the authorization token, store the authorization data specific to the remote network resource at the user agent and redirecting the user agent to the remote network resource to cause the user agent to make another request for the remote network resource.

12. The system of claim 11, wherein the filter is configured to store the authorization data at the user agent by setting a cookie at the user agent, the cookie indicating at least a domain or hostname of the remote network resource.

13. The system of claim 12, the cookie further indicating a unique identifier for the user agent.

14. The system of claim 11, wherein the policy server is configured to determine the resource access policy by determining a policy group associated with the remote network resource and the authorization data, and by using the policy group to look up the resource access policy.

15. The system of claim 11, wherein the policy server is configured to determine a most restrictive policy as the resource access policy when determining that the request does not contain the authorization data.

16. The system of claim 11, wherein the authorization token represents a username with which the authorization portal performs an authentication process with the user agent.

17. The system of claim 16, wherein the policy server is further configured to read an authentication-portal cookie to determine whether a previous authentication remains valid, and redirect the user agent to the requested remote network resource with the authorization token when the previous authentication remains valid.

18. The system of claim 11, further comprising the authorization portal, the authorization portal configured to redirect the user agent to the requested remote network resource with the authorization token.

19. The system of claim 11, wherein the authorization token includes information contained in an HTTP header.

20. The system of claim 11, wherein the authorization token includes a unique identifier known to both the authorization portal and the filter.

21. A non-transitory computer-readable storage medium having stored thereon executable instructions that, as a result of being executed by one or more processors of a computer system, cause the computer system to:
  receive from a user agent a request for a remote network resource, the request being adapted to contain authorization data specific to the remote network resource;
  obtain from the request authorization data specific to the remote network resource when the request contains the authorization data;
  determine a resource access policy for the request using the authorization data and a shared secret, wherein the shared secret is shared by a policy service and an authorization portal;
  exclude the user agent from the shared secret;
  prevent modification of tokens passed between the policy service and the authorization portal;
  compare the authorization data to assigned tokens and, if the authorization data matches one of the assigned tokens, determining the resource access policy to allow access by the user agent to the remote network resource;
  apply the resource access policy to allow or deny access by the user agent to the remote network resource;
  when denying access to the remote network resource, generate a request token using the shared secret and redirecting the user agent to the authorization portal, the redirection containing the request token;
  after authorization by the authorization portal, receive from the user agent an authorized request for the remote network resource, the authorized request including an authorization token generated by the authorization portal using the shared secret; and
  in response to receiving the authorized request including the authorization token, store the authorization data specific to the remote network resource at the user agent and redirect the user agent to the remote network resource to cause the user agent to make another request for the remote network resource.

22. The medium of claim 21, wherein the authorization portal is configured to provide the authorization token in an HTTP header when redirecting the user agent.

23. The medium of claim 21, wherein the unique identifier represents a username, and the authorization portal is configured to perform an authentication process with the user agent using the username.

* * * * *

UNITED STATES PATENT AND TRADEMARK OFFICE
CERTIFICATE OF CORRECTION

PATENT NO. : 10,498,734 B2
APPLICATION NO. : 14/401543
DATED : December 3, 2019
INVENTOR(S) : Erb et al.

It is certified that error appears in the above-identified patent and that said Letters Patent is hereby corrected as shown below:

On the Title Page

Item (12) "Erb" should read -- Erb, et al. --.

Item (72) Inventor is corrected to read:
-- Jeremy Erb, Guelph (CA);
Bradley Derek Kite, Reading (UK) --.

Signed and Sealed this
Nineteenth Day of May, 2020

Andrei Iancu
*Director of the United States Patent and Trademark Office*